United States Patent
Pathirakani et al.

(10) Patent No.: US 12,229,008 B2
(45) Date of Patent: Feb. 18, 2025

(54) DELAYED XOR REBUILD WITH PRIORITY IN MULTI-PROTOCOL PRODUCTS

(71) Applicant: Western Digital Technologies, Inc., San Jose, CA (US)

(72) Inventors: Ganesh Kumar Pathirakani, Kovilpatti (IN); Dattatreya Nayak, Bangalore (IN); Venkatesh Ramadoss, Kumbakonam (IN); Tarun Nimmagadda, Bangalore (IN)

(73) Assignee: Sandisk Technologies, Inc., Milpitas, CA (US)

( * ) Notice: Subject to any disclaimer, the term of this patent is extended or adjusted under 35 U.S.C. 154(b) by 10 days.

(21) Appl. No.: 18/218,849

(22) Filed: Jul. 6, 2023

(65) Prior Publication Data

US 2024/0256383 A1    Aug. 1, 2024

Related U.S. Application Data

(60) Provisional application No. 63/442,407, filed on Jan. 31, 2023.

(51) Int. Cl.
   *G06F 11/10*   (2006.01)
(52) U.S. Cl.
   CPC ........ *G06F 11/1092* (2013.01); *G06F 11/108* (2013.01)

(58) Field of Classification Search
   CPC .................... G06F 11/1092; G06F 11/108
   USPC ........................................... 714/6.24
   See application file for complete search history.

(56) References Cited

U.S. PATENT DOCUMENTS 7,631,128 B1 *  12/2009  Sgrosso ............. H04L 49/557
                                                    710/36
2020/0409579 A1 * 12/2020  Mehta ................. G06F 3/0659

\* cited by examiner

*Primary Examiner* — Yair Leibovich
(74) *Attorney, Agent, or Firm* — PATTERSON + SHERIDAN, LLP

(57) ABSTRACT

A data storage device includes a memory device and a controller coupled to the memory device. The controller is configured to operate under at least a first device protocol and a second device protocol, where the first and second device protocols have different endurance and protection requirements. When data is programmed to the memory device using the first device protocol, but is read from the memory device using the second device protocol, the differing endurance and protection requirements may cause issues in reading the data. In order to alleviate the issues, during idle time of the second device protocol, the controller may program the data using the endurance and protection requirements of the second device protocol to a different portion of the memory device so that the data may be read using either or both device protocols with the appropriate recovery information.

20 Claims, 4 Drawing Sheets

DELAYED XOR REBUILD WITH PRIORITY IN MULTI-PROTOCOL PRODUCTS

CROSS-REFERENCE TO RELATED APPLICATIONS

This application claims benefit of U.S. Provisional Patent Application Ser. No. 63/442,407, filed Jan. 31, 2023, which is herein incorporated by reference.

BACKGROUND OF THE DISCLOSURE

Field of the Disclosure

Embodiments of the present disclosure are generally related to data storage devices, such as solid state drives (SSDs), and, more specifically, handling data protection requirements of multiple data storage device operating protocols.

Description of the Related Art

Data storage devices may operate under different protocols, such as Secure Digital (SD), Universal Serial Bus (USB), Non-Volatile Memory Express (NVMe), and the like. Each protocol may differ in endurance requirements and data protection requirements. For example, data stored using a first data storage device operating protocol may require a greater amount of data protection than data stored using a second data storage device operating protocol. Data recovery is a key feature of data storage devices. The data storage devices offers both hardware and software algorithms to recover corrupted data. However, the algorithms may be limited by the available power and computing capabilities of the data storage device. For example, exclusive or (XOR) parity is a system level solution to tackle data corruption. Depending on the protocol, the amount of time to compute XOR parity data for data being programmed to the memory device may differ.

In multi-protocol data storage devices, which have to satisfy varying protocol requirements, the controller of the data storage device may behave similarly for the various supported protocols. In protocols where XOR parity data cannot be generated in the timing requirements (i.e., write timeouts and mount timeouts), XOR parity data may be replaced with dummy/padded data. In other words, the amount of protection for the data being programmed may be less than an amount of protection for a different protocol. During data storage device operation, data programmed to the memory device under a first data storage device operating protocol may be used/read under a second data storage device operating protocol. When the data is programmed under the first protocol, dummy/padded data may be generated in lieu of the XOR parity data due to the timing requirements of the first data storage device. Thus, when the controller reads the data under the second protocol, the data may be corrupted to a point where the second protocol is unable to recover the data due to the protection requirement limitations of the first protocol.

Therefore, there is a need in the art for a data storage device capable of recovering data programmed under one data storage device operating protocol and read under another data storage device operating protocol.

SUMMARY OF THE DISCLOSURE

The present disclosure generally relates to data storage devices, such as solid state drives (SSDs), and, more specifically, handling data protection requirements of multiple data storage device operating protocols. A data storage device includes a memory device and a controller coupled to the memory device. The controller is configured to operate under at least a first device protocol and a second device protocol, where the first device protocol and the second device protocol each has different endurance and protection requirements. When data is programmed to the memory device using the first device protocol, but is read from the memory device using the second device protocol, the differing endurance and protection requirements may cause issues in reading the data. In order to alleviate the issues, during idle time of the second device protocol, the controller may program the data using the endurance and protection requirements of the second device protocol to a different portion of the memory device so that the data may be read using either or both device protocols with the appropriate recovery information.

In one embodiment, a data storage device includes a memory device and a controller coupled to the memory device. The controller is configured to determine that a first block has been closed, determine that the first block is associated with a first data storage device operating protocol, wherein the controller is configured to operate under the first data storage device operating protocol and a second data storage device operating protocol, and wherein a first amount of parity data is generated for the first block in the first data storage device operating protocol, generate a second amount of parity data for the first block, and wherein the second amount of parity data is greater than the first amount of parity data, and read data associated with the first block using the second data storage device operating protocol, wherein reading the data of the first block additionally comprises reading the generated second amount of parity data for the first block.

In another embodiment, a data storage device includes a memory device and a controller coupled to the memory device. The controller is configured to receive data to be programmed to the memory device using a first data storage device operating protocol, determine a protection requirement of the received data, program the received data to either a first block of the memory device or a second block of the memory device based on the determined protection requirement using the first data storage device operating protocol, wherein the first block has a higher protection requirement than the second block, and wherein the first block and the second block are associated with the first data storage device operating protocol, determine that the data storage device is operating using a second data storage device operating protocol, wherein the second data storage device operating protocol is different from the first data storage device operating protocol, generate parity data associated with the associated with the programmed received data while the data storage device is operating using the second data storage device operating protocol, and program the parity data and the received data to a third block, wherein the third block is associated with the second data storage device operating protocol.

In another embodiment, a data storage device includes memory means and a controller coupled to the memory means. The controller is configured to detect that data stored in a first location of the memory means was programmed using a first data storage device operating protocol, wherein the controller is operating under a second data storage device operating protocol during the detecting, and wherein the data stored in the first location of the memory means comprises a different amount of parity data than a required amount of parity data associated with the second data storage device operating protocol, generate parity data for the data stored in the first location of the memory means, wherein the generating occurs under the second data storage device operating protocol, program the generated parity data to a second location of the memory means, receive a read command for the data while the controller is operating under the second data storage device operating protocol, and read the generated parity data and the data from the memory means using the second data storage device operating protocol.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specifically described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to data storage devices, such as solid state drives (SSDs), and, more specifically, handling data protection requirements of multiple data storage device operating protocols. A data storage device includes a memory device and a controller coupled to the memory device. The controller is configured to operate under at least a first device protocol and a second device protocol, where the first device protocol and the second device protocol each has different endurance and protection requirements. When data is programmed to the memory device using the first device protocol, but is read from the memory device using the second device protocol, the differing endurance and protection requirements may cause issues in reading the data. In order to alleviate the issues, during idle time of the second device protocol, the controller may program the data using the endurance and protection requirements of the second device protocol to a different portion of the memory device so that the data may be read using either or both device protocols with the appropriate recovery information.

Figure 1:
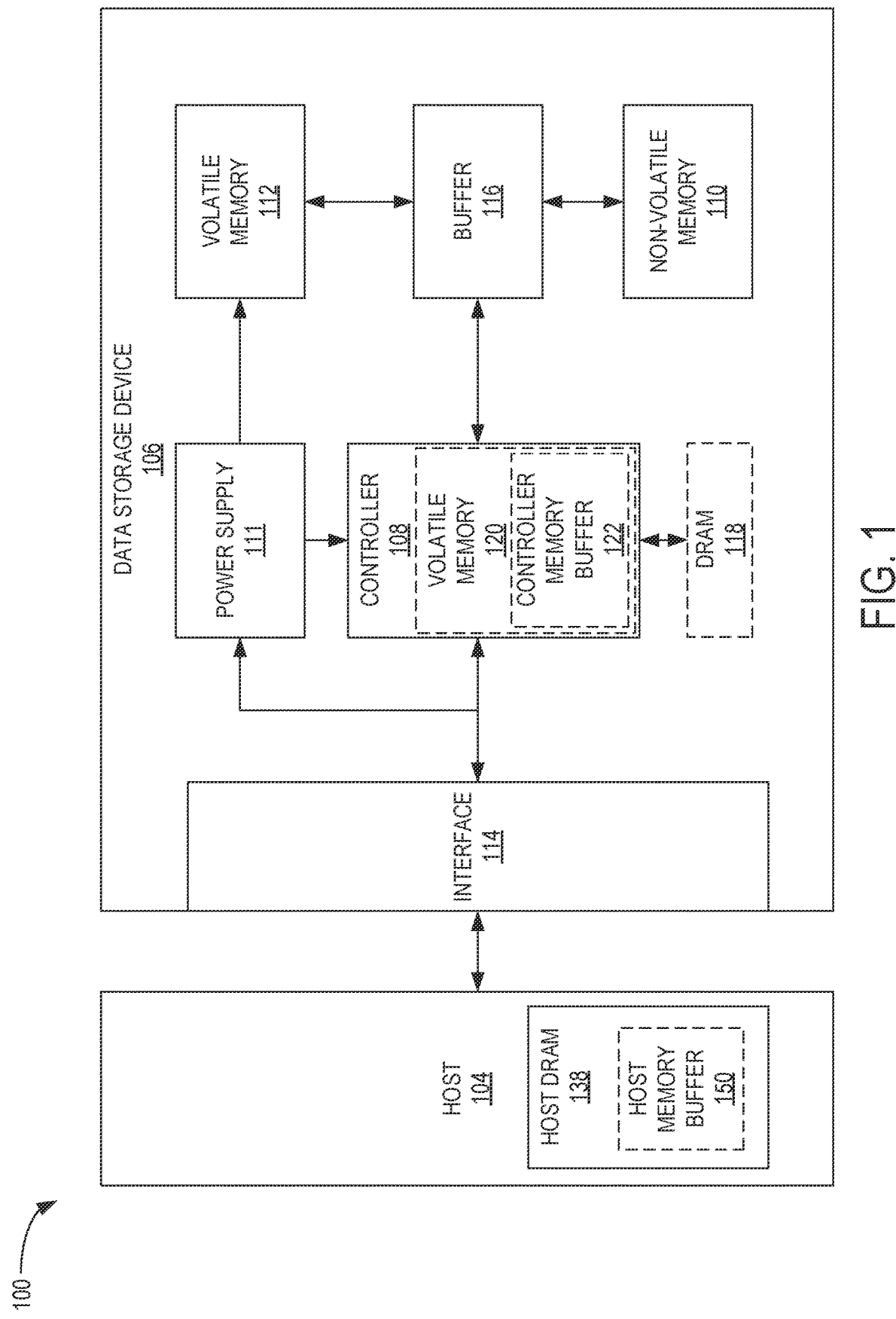
FIG. 1 is a schematic block diagram illustrating a storage system in which a data storage device may function as a storage device for a host device, according to certain embodiments.

FIG. 1 is a schematic block diagram illustrating a storage system 100 having a data storage device 106 that may function as a storage device for a host device 104, according to certain embodiments. For instance, the host device 104 may utilize a non-volatile memory (NVM) 110 included in data storage device 106 to store and retrieve data. The host device 104 comprises a host DRAM 138. In some examples, the storage system 100 may include a plurality of storage devices, such as the data storage device 106, which may operate as a storage array. For instance, the storage system 100 may include a plurality of data storage devices 106 configured as a redundant array of inexpensive/independent disks (RAID) that collectively function as a mass storage device for the host device 104.

The host device 104 may store and/or retrieve data to and/or from one or more storage devices, such as the data storage device 106. As illustrated in FIG. 1, the host device 104 may communicate with the data storage device 106 via an interface 114. The host device 104 may comprise any of a wide range of devices, including computer servers, network-attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or other devices capable of sending or receiving data from a data storage device.

The host DRAM 138 may optionally include a host memory buffer (HMB) 150. The HMB 150 is a portion of the host DRAM 138 that is allocated to the data storage device 106 for exclusive use by a controller 108 of the data storage device 106. For example, the controller 108 may store mapping data, buffered commands, logical to physical (L2P) tables, metadata, and the like in the HMB 150. In other words, the HMB 150 may be used by the controller 108 to store data that would normally be stored in a volatile memory 112, a buffer 116, an internal memory of the controller 108, such as static random access memory (SRAM), and the like. In examples where the data storage device 106 does not include a DRAM (i.e., optional DRAM 118), the controller 108 may utilize the HMB 150 as the DRAM of the data storage device 106.

The data storage device 106 includes the controller 108, NVM 110, a power supply 111, volatile memory 112, the interface 114, a write buffer 116, and an optional DRAM 118. In some examples, the data storage device 106 may include additional components not shown in FIG. 1 for the sake of clarity. For example, the data storage device 106 may include a printed circuit board (PCB) to which components of the data storage device 106 are mechanically attached and which includes electrically conductive traces that electrically interconnect components of the data storage device 106 or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe x1, x4, x8, x16, PCIe Mini Card, MiniPCI, etc.). In some examples, the data storage device 106 may be directly coupled (e.g., directly soldered or plugged into a connector) to a motherboard of the host device 104.

Interface 114 may include one or both of a data bus for exchanging data with the host device 104 and a control bus for exchanging commands with the host device 104. Interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like. Interface 114 (e.g., the data bus, the control bus, or both) is electrically connected to the controller 108, providing an electrical connection between the host device 104 and the controller 108, allowing data to be exchanged between the host device 104 and the controller 108. In some examples, the electrical connection of interface 114 may also permit the data storage device 106 to receive power from the host device 104. For example, as illustrated in FIG. 1, the power supply 111 may receive power from the host device 104 via interface 114.

The NVM 110 may include a plurality of memory devices or memory units. NVM 110 may be configured to store and/or retrieve data. For instance, a memory unit of NVM 110 may receive data and a message from controller 108 that instructs the memory unit to store the data. Similarly, the memory unit may receive a message from controller 108 that instructs the memory unit to retrieve data. In some examples, each of the memory units may be referred to as a die. In some examples, the NVM 110 may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit may include any type of non-volatile memory devices, such as flash memory devices, phase-change memory (PCM) devices, resistive random-access memory (ReRAM) devices, magneto-resistive random-access memory (MRAM) devices, ferroelectric random-access memory (F-RAM), holographic memory devices, and any other type of non-volatile memory devices.

The NVM 110 may comprise a plurality of flash memory devices or memory units. NVM Flash memory devices may include NAND or NOR-based flash memory devices and may store data based on a charge contained in a floating gate of a transistor for each flash memory cell. In NVM flash memory devices, the flash memory device may be divided into a plurality of dies, where each die of the plurality of dies includes a plurality of physical or logical blocks, which may be further divided into a plurality of pages. Each block of the plurality of blocks within a particular memory device may include a plurality of NVM cells. Rows of NVM cells may be electrically connected using a word line to define a page of a plurality of pages. Respective cells in each of the plurality of pages may be electrically connected to respective bit lines. Furthermore, NVM flash memory devices may be 2D or 3D devices and may be single level cell (SLC), multi-level cell (MLC), triple level cell (TLC), or quad level cell (QLC). The controller 108 may write data to and read data from NVM flash memory devices at the page level and erase data from NVM flash memory devices at the block level.

The power supply 111 may provide power to one or more components of the data storage device 106. When operating in a standard mode, the power supply 111 may provide power to one or more components using power provided by an external device, such as the host device 104. For instance, the power supply 111 may provide power to the one or more components using power received from the host device 104 via interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, super-capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The volatile memory 112 may be used by controller 108 to store information. Volatile memory 112 may include one or more volatile memory devices. In some examples, controller 108 may use volatile memory 112 as a cache. For instance, controller 108 may store cached information in volatile memory 112 until the cached information is written to the NVM 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)). Likewise, the optional DRAM 118 may be utilized to store mapping data, buffered commands, logical to physical (L2P) tables, metadata, cached data, and the like in the optional DRAM 118. In some examples, the data storage device 106 does not include the optional DRAM 118, such that the data storage device 106 is DRAM-less. In other examples, the data storage device 106 includes the optional DRAM 118.

Controller 108 may manage one or more operations of the data storage device 106. For instance, controller 108 may manage the reading of data from and/or the writing of data to the NVM 110. In some embodiments, when the data storage device 106 receives a write command from the host device 104, the controller 108 may initiate a data storage command to store data to the NVM 110 and monitor the progress of the data storage command. Controller 108 may determine at least one operational characteristic of the storage system 100 and store at least one operational characteristic in the NVM 110. In some embodiments, when the data storage device 106 receives a write command from the host device 104, the controller 108 temporarily stores the data associated with the write command in the internal memory or write buffer 116 before sending the data to the NVM 110. Furthermore, when programming data to the NVM 110, the controller 108 may generate protection data, such as XOR parity data, in a non-limiting example, for the data being programmed to the NVM 110.

The controller 108 may include an optional second volatile memory 120. The optional second volatile memory 120 may be similar to the volatile memory 112. For example, the optional second volatile memory 120 may be SRAM. The controller 108 may allocate a portion of the optional second volatile memory to the host device 104 as controller memory buffer (CMB) 122. The CMB 122 may be accessed directly by the host device 104. For example, rather than maintaining one or more submission queues in the host device 104, the host device 104 may utilize the CMB 122 to store the one or more submission queues normally maintained in the host device 104. In other words, the host device 104 may generate commands and store the generated commands, with or without the associated data, in the CMB 122, where the controller 108 accesses the CMB 122 in order to retrieve the stored generated commands and/or associated data.

The controller 108 may operate under multiple protocols, such that the data storage device 106 is a multi-protocol data storage device. For example, the controller 108 may operate in accordance with one or more of the following protocols: SD, NVMe, USB, and the like. For example, the controller 108 may first operate in accordance with SD protocol and swap to operate in accordance with the NVMe protocol. It is to be understood that in the description herein, references to specific protocols are not intended to be limiting, but to provide an example of a possible embodiment.

In legacy SD data storage devices, XOR protection may not be implemented due to timing requirements for the SD data storage devices. For example, the timing requirements may be 250 milliseconds (ms) for a write timeout, 100 ms for a read timeout, and 1000 ms for a mount timeout. However, NVMe data storage devices do not have timing restrictions. NVMe has more endurance and protection requirements, which differs from the SD protocol due to the timing requirements of the SD protocol. For example, if XOR protection were to be generated for the SD data storage device, a timeout would likely occur.

Figure 2:
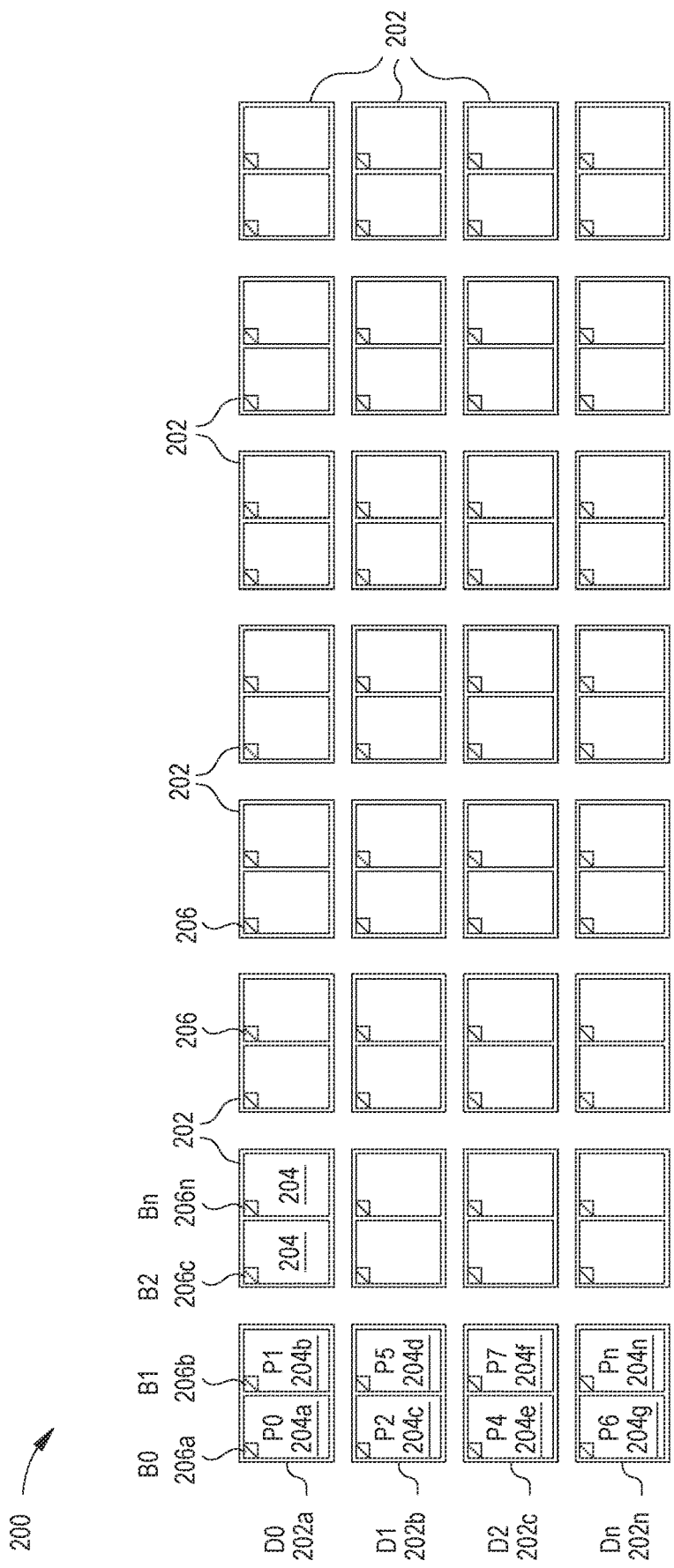
FIG. 2 is an illustration of a memory device, according to certain embodiments.

FIG. 2 is an illustration of a memory device 200, which may be the NVM 110 of FIG. 1, according to certain embodiments. The memory device 200 includes a plurality of dies 202a-202n, collectively referred to as dies 202, where each die of the plurality of dies 202a-202n includes a first plane 204a and a second plane 204b, collectively referred to as planes 204. Each of the planes 204 includes a plurality of blocks 206a-206n, collectively referred to as block 206. While 32 dies 502 are shown in the memory device 200, any number of dies may be included. Furthermore, the dies 202 may be split into a plurality of sets of dies, where each sets of dies has one or more distinct dies of the plurality of dies 202a-202n. For example, a first die 202a may be in a first set of dies and a second set of dies may include a second die 202b and a third die 202c. Each of the sets of dies may be associated with a flash channel of a controller, such as the controller 108 of FIG. 1, where the controller includes a flash interface module (FIM). The FIM may be configured to read data from and write data to the memory device 200, where commands are sent via a respective flash channel program data to a respective die the memory device 200 or read data from a respective die of the memory device 200. The memory device 200 may be SLC memory, MLC memory, TLC memory, QLC memory, or the like.

The open blocks (i.e., the blocks that are not yet programmed completely and closed) of memory device 200 and the resources of the data storage device may be segregated between data storage device operating protocols as well as within the same data storage device operating protocol. It is to be understood that the not yet programmed blocks may be referred to as free blocks and maintained in a free block pool. For example, for a first data storage device operating protocol, such as the SD protocol, the open blocks allocated from the memory device 200 for the SD protocol may be segregated into a first endurance zone and a second endurance zone, where the second endurance zone has a higher protection requirement (i.e., requires more protection data, such as XOR parity data) than the first endurance zone. When the controller, such as the controller 108 of FIG. 1, operates under the second data storage device operating protocol, the controller may generate protection data (or additional protection data), such as XOR parity data, in accordance with the protection requirements of the second data storage device operating protocol, for the data in the second endurance zone prior to generating protection data (or additional protection data), in accordance with the protection requirements of the second data storage device operating protocol, for the data in the first endurance zone.

Thus, during data storage device operation, the first endurance zone and the second endurance zone may each be an open block (or open blocks), where the controller may keep track of which data of which endurance zone to service next during an idle time or during a garbage collection operation while operating under the second data storage device operating protocol. For example, the controller may queue, in either a chronological order or any other relevant order, an identification (ID) associated with the data programmed to the first endurance zone or the data programmed to the second endurance zone, where IDs associated with the second endurance zone are queued prior to IDs of the first endurance zone. In some examples, an ID associated with the second endurance zone may be queued in front of a previously queued ID associated with data of the first endurance zone. Furthermore, the controller may check or determine, while operating in the second data storage device operating protocol, whether data programmed to the memory device 200 under the first data storage device protocol if the level of protection is consistent with the level of protection required for the second data storage device operating protocol. If the level of protection associated with the data is less than the level of protection required for the second data storage device operating protection, then the controller may generate additional protection data or add the ID of the data to the queue to be serviced.

In some examples, when the controller generates additional protection data for data stored in the memory device 200, the controller may copy or move the data from a first location of the memory device 200 associated with the first data storage device operating protocol to a second location of the memory device 200 associated with the second data storage device protocol, where the data and the additional protection data are programmed to the second location. In other examples, the additional protection data may be programmed separately from the data in the second location. Furthermore, each data storage device operating protocol (e.g., the first data storage device protocol and the second data storage device protocol) may use protection data in the second location to recover the data in either protocol. In other words, the protection data generated may be applicable for both the first data storage device operating protocol and the second data storage device operating protocol. When the data and the protection data are programmed to the second location, the first data storage device operating protocol may be made aware that the data and protection have been programmed to the second location.

Figure 3:
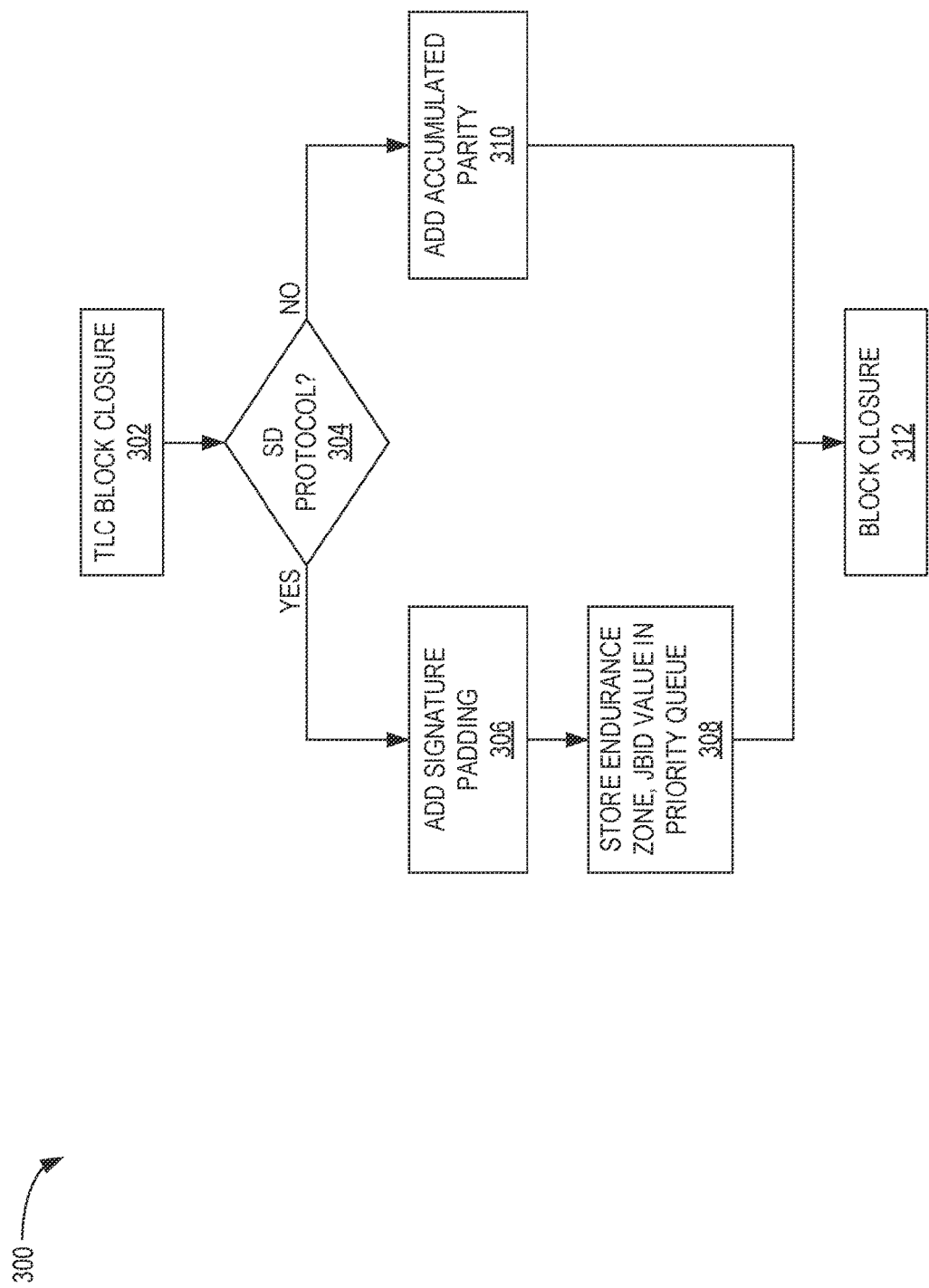
FIG. 3 is a flow diagram illustrating a method of closing a block in a memory device of a data storage device configured to operate under a first data storage device operating protocol and a second data storage device operating protocol, according to certain embodiments.

FIG. 3 is a flow diagram illustrating a method 300 of closing a block in a memory device of a data storage device configured to operate under a first data storage device operating protocol and a second data storage device operating protocol, according to certain embodiments. For exemplary purposes, aspects of the storage system 100 of FIG. 1 may be referenced herein. For example, the controller 108 may be responsible for implementing method 300.

At block 302, the controller 108 determines that a TLC block is to be closed. It is to be understood that reference to a TLC block is not intended to be limiting, but to provide an example of a possible embodiment. For example, the described embodiments may be applicable to QLC blocks and the like. At block 304, the controller 108 determines if the controller 108 is operating under the SD protocol. If the controller 108 is operating under the SD protocol at block 304, then the controller 108 adds signature padding at block 306 (i.e., dummy/padded data) to the data to indicate invalid parity in the parity word lines. In other words, the data in the TLC block does not have XOR recovery bin information if the data is corrupt. At block 308, the controller 108 stores the endurance zone and jumbo block ID (JBID) associated with the TLC block in a priority queue based on the priority of the endurance zone. For example, the endurance zone may be a high priority endurance zone, where protection data is needed for the data of the TLC block. The priority queue may be managed within the controller 108 and stored in an internal volatile memory, such as the second volatile memory 120, in the buffer 116, or the volatile memory 112. At block 312, the controller 108 closes the TLC block.

However, if the controller is not operating under the SD protocol at block 304 (i.e., operating in an NVMe mode or the like), the controller 108 generates the accumulated parity (e.g., XOR parity data) for the data and adds the parity to the relevant location (e.g., with the TLC block or another TLC block designated for parity data) at block 310. At block 312, the controller 108 closes the TLC block.

Figure 4:
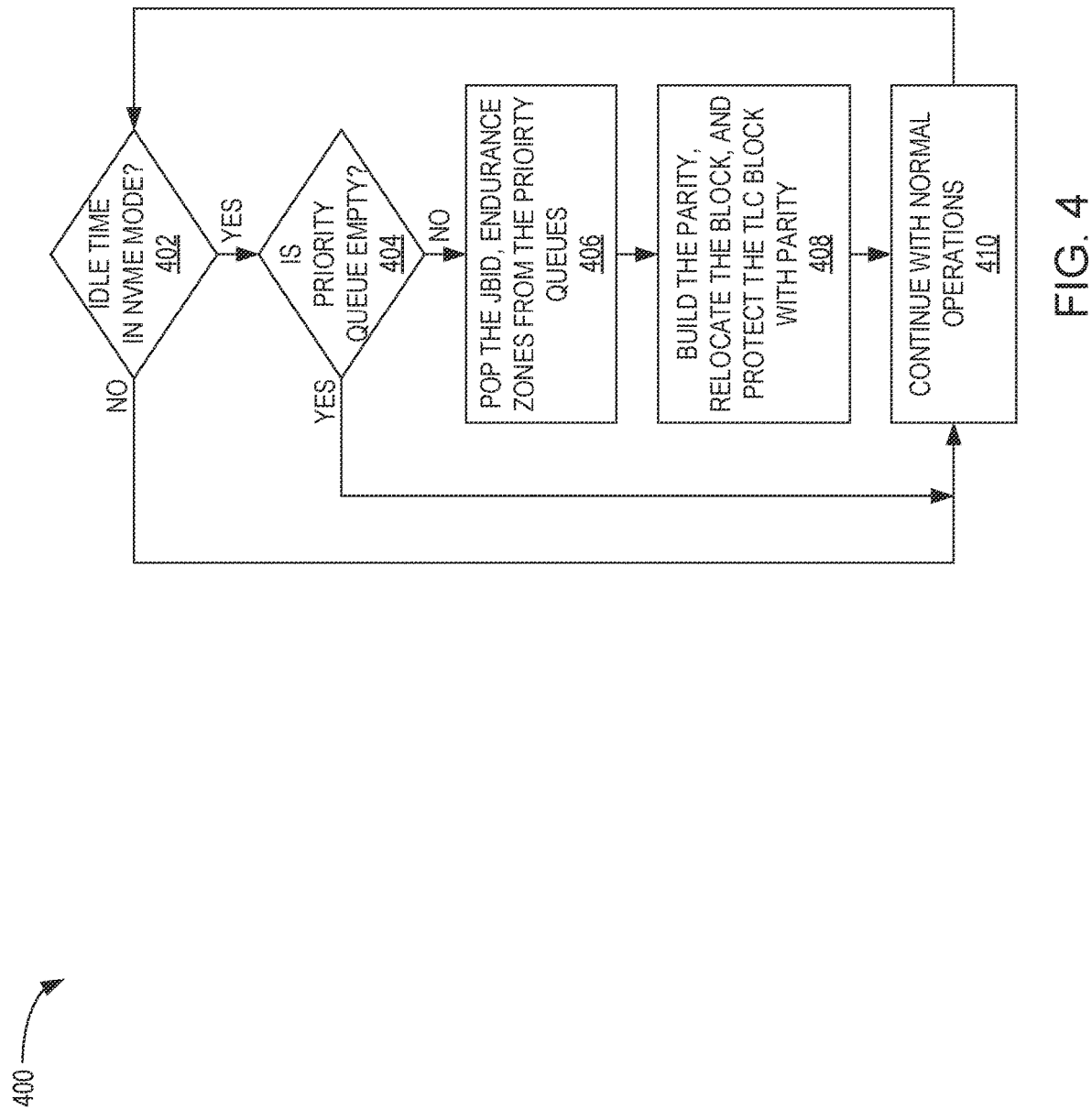
FIG. 4 is a flow diagram illustrating a method of generating parity data for data programmed under a first data storage device operating protocol while operating under a second data storage device operating protocol, according to certain embodiments.

FIG. 4 is a flow diagram illustrating a method 400 of generating parity data for data programmed under a first data storage device operating protocol (e.g., SD mode) while operating under a second data storage device operating protocol (e.g., NVMe mode), according to certain embodiments. For exemplary purposes, aspects of the storage system 100 of FIG. 1 may be referenced herein. For example, the controller 108 may be responsible for implementing method 400.

At block 402, the controller 108 determines if the controller 108 is currently in an idle time (or undergoing garbage collection) while operating in the NVMe mode. If the controller 108 is not in the idle time (or undergoing garbage collection) at block 402, then the controller 108 continues with normal operations at block 410. However, if the controller 108 is in the idle time (or undergoing garbage collection) at block 402, then the controller 108 determines if the priority queue is empty at block 404. It is to be understood that normal operations may refer to any operations that the controller 108 may perform instead of continuing with method 400.

If the priority queue is empty at block 404, then the controller 108 continues with normal operations at block 410. However, if the priority queue is not empty at block 404, then the controller 108 pops the JBID and the associated endurance zones, which may be associated with the TLC block closed in method 300 of FIG. 3, from the priority queue at block 406. It is to be understood that reference to a TLC block is not intended to be limiting, but to provide an example of a possible embodiment. For example, the described embodiments may be applicable to QLC blocks and the like. At block 408, the controller 108 builds the parity, relocates the data of the TLC block associated with the JBID and the associated endurance zones to a TLC block associated with the NVMe mode, and protects the relocated TLC block with the built parity. The parity may be built in respect to the protection and endurance requirements of the NVMe mode. At block 410, the controller 108 continues with normal operations.

By utilizing idle time to generate protection data for data programmed to a memory device using a first data storage device operating protocol while operating in a second data storage device operating protocol, the data may read while the data storage device is operating in the second data storage device operating protocol, which may increase a quality of service provided by the data storage device.

In one embodiment, a data storage device includes a memory device and a controller coupled to the memory device. The controller is configured to determine that a first block of memory of the memory device has been closed, determine that the first block is associated with a first data storage device operating protocol, wherein the controller is configured to operate under the first data storage device operating protocol and a second data storage device operating protocol, and wherein a first amount of parity data is generated for the first block in the first data storage device operating protocol, generate a second amount of parity data for the first block, and wherein the second amount of parity data is greater than the first amount of parity data, and read data associated with the first block using the second data storage device operating protocol, wherein reading the data of the first block additionally comprises reading the generated second amount of parity data for the first block.

The first amount of parity data is zero. The controller is further configured to store an identification (ID) value associated with the first block to a priority queue. The first block is associated with a first endurance zone of the memory device. The memory device comprises the first endurance zone and a second endurance zone. The first endurance zone has a higher endurance requirement than the second endurance zone. The generating the second amount of parity data is responsive to the ID value in the priority queue popping. ID values associated with the first endurance zone have a higher priority than ID values associated with the second endurance zone. Parity data associated with data of the first endurance zone is generated prior to generating parity data associated with data of the second endurance zone. The generated second amount of parity data is stored in a second block of the memory device. The data of the first block is moved to the second block responsive to generating the second amount of parity, wherein reading the data associated with the first block comprises reading data of the first block from the second block. The generating occurs when the controller is operating using the second data storage device operating protocol. The generating further occurs during an idle time of the second data storage device operating protocol. The generating further occurs during a garbage collection operation while the controller is operating using the second data storage device operating protocol. The controller is further configured to determine that the first amount of parity data programmed using the first data storage device operating protocol for the first block is not consistent with a required level of protection associated with the second data storage device operating protocol and perform the generating responsive to determining that the first amount of parity data programmed using the first data storage device operating protocol for the first block is not consistent with a required level of protection associated with the second data storage device operating protocol.

In another embodiment, a data storage device includes a memory device and a controller coupled to the memory device. The controller is configured to receive data to be programmed to the memory device using a first data storage device operating protocol, determine a protection requirement of the received data, program the received data to either a first block of the memory device or a second block of the memory device based on the determined protection requirement using the first data storage device operating protocol, wherein the first block has a higher protection requirement than the second block, and wherein the first block and the second block are associated with the first data storage device operating protocol, determine that the data storage device is operating using a second data storage device operating protocol, wherein the second data storage device operating protocol is different from the first data storage device operating protocol, generate parity data associated with the associated with the programmed received data while the data storage device is operating using the second data storage device operating protocol, and program the parity data and the received data to a third block, wherein the third block is associated with the second data storage device operating protocol.

The controller is further configured to add an identification (ID) value associated with the programmed received data to a priority queue. The generating is based on the priority queue. The programming the received data using the first data storage device operating protocol comprises programming signature padding to one or more parity wordlines associated with the received data. The signature padding indicates that the one or more parity wordlines comprises invalid parity data. The second data storage device operating protocol has a higher protection requirement than the first data storage device operating protocol. The generating further comprises determining that the first block or the second block is closed. The first block, the second block, and the third block are either triple level cell (TLC) memory or quad level cell (QLC) memory.

In another embodiment, a data storage device includes memory means and a controller coupled to the memory means. The controller is configured to detect that data stored in a first location of the memory means was programmed using a first data storage device operating protocol, wherein the controller is operating under a second data storage device operating protocol during the detecting, and wherein the data stored in the first location of the memory means comprises a different amount of parity data than a required amount of parity data associated with the second data storage device operating protocol, generate parity data for the data stored in the first location of the memory means, wherein the generating occurs under the second data storage device operating protocol, program the generated parity data to a second location of the memory means, receive a read command for the data while the controller is operating under the second data storage device operating protocol, and read the generated parity data and the data from the memory means using the second data storage device operating protocol.

The generating occurs during an idle time or a garbage collection operation. The data is relocated from the first location of the memory means to the second location of the memory means. The reading the generated parity data and the data from the memory means occurs from the second location of the memory means.

While the foregoing is directed to embodiments of the present disclosure, other and further embodiments of the disclosure may be devised without departing from the basic scope thereof, and the scope thereof is determined by the claims that follow.

What is claimed is:
1. A data storage device, comprising:
a memory; and
a controller coupled to the memory, wherein the controller is configured to:
  determine that a first block of memory of the memory has been closed;
  determine that the first block is associated with a first data storage device operating protocol, wherein the controller is configured to operate under the first data storage device operating protocol and a second data storage device operating protocol, and wherein a first amount of parity data is generated for the first block in the first data storage device operating protocol;
  generate a second amount of parity data for the first block, wherein the second amount of parity data is greater than the first amount of parity data; and
  read data from the first block using the second data storage device operating protocol, wherein reading the data from the first block additionally comprises reading the generated second amount of parity data for the first block.

2. The data storage device of claim 1, wherein the first amount of parity data is zero.

3. The data storage device of claim 1, wherein the controller is further configured to:
  store an identification (ID) value associated with the first block to a priority queue, wherein:
    the first block is associated with a first endurance zone of the memory;
    the memory comprises the first endurance zone and a second endurance zone; and
    the first endurance zone has a higher endurance requirement than the second endurance zone.

4. The data storage device of claim 3, wherein:
  the generating the second amount of parity data is responsive: to the ID value in the priority queue, popping;
  ID values associated with the first endurance zone having a higher priority than ID values associated with the second endurance zone; and
  parity data associated with data of the first endurance zone being generated prior to generating parity data associated with data of the second endurance zone.

5. The data storage device of claim 1, wherein the generated second amount of parity data is stored in a second block of the memory.

6. The data storage device of claim 5, wherein the data from the first block is moved to the second block responsive to generating the second amount of parity, wherein reading the data from the first block comprises reading data from the first block from the second block.

7. The data storage device of claim 1, wherein generating the second amount of parity data occurs when the controller is operating using the second data storage device operating protocol.

8. The data storage device of claim 7, wherein generating the second amount of parity data further occurs during an idle time of the second data storage device operating protocol.

9. The data storage device of claim 7, wherein generating the second amount of parity data further occurs during a garbage collection operation while the controller is operating using the second data storage device operating protocol.

10. The data storage device of claim 1, wherein the controller is further configured to:
    determine that the first amount of parity data programmed using the first data storage device operating protocol for the first block is not consistent with a required level of protection associated with the second data storage device operating protocol; and
    perform generating the second amount of parity data responsive to determining that the first amount of parity data programmed using the first data storage device operating protocol for the first block is not consistent with a required level of protection associated with the second data storage device operating protocol.

11. A data storage device, comprising:
    a memory; and
    a controller coupled to the memory, wherein the controller is configured to:
      receive data to be programmed to the memory using a first data storage device operating protocol;
      determine a protection requirement of the received data;
      program the received data to either a first block of the memory or a second block of the memory based on the determined protection requirement using the first data storage device operating protocol, wherein:
        the first block has a higher protection requirement than the second block; and
        the first block and the second block are associated with the first data storage device operating protocol;
      determine that the data storage device is operating using a second data storage device operating protocol, wherein the second data storage device operating protocol is different from the first data storage device operating protocol;
      generate parity data associated with the programmed received data while the data storage device is operating using the second data storage device operating protocol; and
      program the parity data and the received data to a third block, wherein the third block is associated with the second data storage device operating protocol.

12. The data storage device of claim 11, wherein the controller is further configured to add an identification (ID) value associated with the programmed received data to a priority queue.

13. The data storage device of claim 12, wherein the generating is based on the priority queue.

14. The data storage device of claim 11, wherein:
    the programming the received data using the first data storage device operating protocol comprises programming signature padding to one or more parity wordlines associated with the received data; and
    the signature padding indicates that the one or more parity wordlines comprises invalid parity data.

15. The data storage device of claim 11, wherein the second data storage device operating protocol has a higher protection requirement than the first data storage device operating protocol.

16. The data storage device of claim 11, wherein the generating further comprises determining that the first block or the second block is closed.

17. The data storage device of claim 11, wherein the first block, the second block, and the third block are either triple level cell (TLC) memory or quad level cell (QLC) memory.

18. A data storage device, comprising:
    means to store data; and
    a controller coupled to the means to store data, wherein the controller is configured to:
      detect that data stored in a first location of the means to store data was programmed using a first data storage device operating protocol, wherein:
        the controller is operating under a second data storage device operating protocol during the detecting; and
        the data stored in the first location of the means to store data comprises less parity data than a required minimum amount of parity data associated with the second data storage device operating protocol;
      generate parity data for the data stored in the first location of the means to store data, wherein the generating occurs under the second data storage device operating protocol;
      program the generated parity data to a second location of the means to store data;
      receive a read command for the data stored in the first location while the controller is operating under the second data storage device operating protocol; and
      read the generated parity data and the data stored in the first location from the means to store data using the second data storage device operating protocol.

19. The data storage device of claim 18, wherein the generating occurs during an idle time or a garbage collection operation.

20. The data storage device of claim 18, wherein:
    the data stored in the first location is relocated from the first location of the means to store data to the second location of the means to store data; and
    the reading the generated parity data and the data stored in the first location from the means to store data occurs from the second location of the means to store data.

* * * * *